(12) United States Patent
Tanaka

(10) Patent No.: US 6,370,281 B1
(45) Date of Patent: Apr. 9, 2002

(54) APPARATUS AND METHOD FOR DETECTING ENLARGING RATIO OR REDUCING RATIO OF IMAGE DATA

(75) Inventor: Kazuyoshi Tanaka, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/201,984

(22) Filed: Dec. 1, 1998

(30) Foreign Application Priority Data

Dec. 1, 1997 (JP) ............................................ 9-329785

(51) Int. Cl.[7] .................................................. G06K 9/48
(52) U.S. Cl. ....................... 382/298; 345/660; 348/561; 348/581
(58) Field of Search ................................ 382/298, 299, 382/197, 295, 293, 302; 345/660, 670, 671; 348/561, 581

(56) References Cited

U.S. PATENT DOCUMENTS 4,907,171 A * 3/1990 Nagashima .................. 364/518
5,206,919 A * 4/1993 Keating ........................ 382/46
5,613,017 A * 3/1997 Rao et al. .................... 382/174
5,828,794 A * 10/1998 Kalayama et al. .......... 382/298
5,901,274 A * 5/1999 Oh .............................. 395/102
5,987,192 A * 11/1999 Maltseu et al. ............. 382/298
6,034,786 A * 3/2000 Kulon ......................... 358/1.2

* cited by examiner

*Primary Examiner*—Bhavesh Mehta
*Assistant Examiner*—Yosef Kassa
(74) *Attorney, Agent, or Firm*—Dickstein Shapiro Morin & Oshinsky LLP

(57) ABSTRACT

An enlarging ratio or reducing ratio detecting apparatus for detecting an enlarging ratio or reducing ratio of digital image data in which the enlarging ratio or reducing ratio of an image is unknown. The apparatus has sectioning means for sectioning the digital image data into horizontal or perpendicular block sizes; conversion means for frequency-converting sectioned blocks into a two-dimension representation; addition means for adding frequencies of the blocks and obtaining a sum of the frequencies; retrieval means for retrieving frequencies at which energy is collecting using an added result; calculation means for calculating an enlarging ratio or reducing ratio based on a retrieved result; and restoration means for restoring an image from image data having the calculated enlarging ratio or reducing ratio.

26 Claims, 3 Drawing Sheets

FREQUENCY DISTRIBUTION OF ORIGINAL IMAGE

FREQUENCY DISTRIBUTION TWOFOLD ENLARGEMENT

FREQUENCY DISTRIBUTION OF A REDUCING RATIO 1/2

APPARATUS AND METHOD FOR DETECTING ENLARGING RATIO OR REDUCING RATIO OF IMAGE DATA

BACKGROUND OF THE INVENTION

The present invention relates to a technology for detecting an enlarging ratio or a reducing ratio of digital image data in which the enlarging ratio or reducing ratio of an image is unknown.

Conventionally, image enlarging or reducing ratio detecting circuit circuits are provided with an enlarging or reducing ratio of an image as an objective. The sought after ratio is provided as additional data for the image in some data form, as is described in JP-A-51294/1992, JP-A-295545/1995 and JP-A-129356/1996.

However, in the above-described technology, the data must be manipulated in a number of ways. There is a chance that during the manipulation the additional data can be easily destroyed as the result of a small data disturbance. Once destroyed, the reducing or enlarging ratio of the original image is lost.

This difficulty can be overcome with the addition of a circuit that has means for restoring the additional data. The circuit can add that a complicated error correction technique or attach additional redundant ratio data to the image data or use a variety of other data integrity improvement methods.

The resulting apparatus, however, becomes to be complicated and has increased dimensional needs.

Also, in the conventional technology, the reducing or enlarging ratio is detected by including a reference signal (referred to as a synchronizing signal) in the image itself. The synchronizing signal is repeated while the image itself is reduced or enlarged and the synchronizing signal can be detected with the largest amplitude to discover the ratio.

However, inserting the synchronizing signal in the image itself provided additional data or noise which has an impact on image quality. Moreover, since the reduction and enlargement is repeatedly conducted over an entire image plane, the operation requires a large amount of processing and memory. The image requires a large amount of physical memory for storage during these operations, and as a consequence the circuit becomes large in size.

SUMMARY OF THE INVENTION

Therefore, it is an objective of the present invention is to solve the above-described tasks.

Also, it is an objective of the present invention is to provide a detection apparatus and a detection method for detecting an appropriate image reducing or enlarging ratio with simple circuit size without affecting quality of an image.

The above-described objective of the present invention is achieved by an enlarging ratio detecting apparatus for detecting an enlarging ratio of a digital image data in which the enlarging ratio of an image is unknown. The enlarging ratio detecting apparatus includes a section unit for sectioning the digital image data, in which the enlarging ratio of an image is unknown, by predetermined horizontal or perpendicular block sizes, a conversion unit for frequency-converting sectioned blocks into a two-dimension, an addition unit operating on each frequency to provide sums of all the individual frequencies over all the blocks, a retrieval unit for retrieving frequencies at which energy is collecting using an added result, a calculation unit for calculating an enlarging ratio based on a retrieved result, and a restoration unit for restoring an image of an image data to an image having the calculated enlarging ratio.

Also, the above-described objective of the present invention is achieved by a reducing ratio detecting apparatus for detecting a reducing ratio of a digital image data in which the reducing ratio of an image is unknown. The reducing ratio detecting apparatus includes a section unit for sectioning the digital image data, in which the reducing ratio of an image is unknown, by predetermined horizontal or perpendicular block sizes, a conversion unit for frequency-converting sectioned blocks into a two-dimension, an addition unit operating on each frequency to obtain sums of all the individual frequencies over all the blocks, a retrieval unit for retrieving frequencies at which energy is collecting using an added result, a calculation unit for calculating a reducing ratio based on a retrieved result, and a restoration means for restoring an image of an image data to an image having the calculated reducing ratio.

It is preferable that the above-described retrieval unit is constructed so as to select n signals which have frequencies in order of the highest energy, and to obtain a frequency-energy distribution in which energy is collecting.

Moreover, the above-described calculation unit determines a set of frequencies from the frequency-energy distribution obtained by the retrieval unit, at which energy is collecting, and calculates an enlarging ratio or reducing ratio that corresponds to this set.

Also, if a loop circuit for returning an output from the above-described restoration unit to the above-described section unit again, even though a correct enlarging ratio or reducing ratio cannot be obtained one time, processing can be conducted again based on a rough enlarging ratio or reducing ratio obtained at the first time.

In addition, of course, it is possible to construct one apparatus, an enlarging ratio or reducing detecting apparatus, by combining the above-described enlarging ratio detecting apparatus and the above-described reducing ratio detecting apparatus.

Also, the above-described objective of the present invention is achieved by an image data enlarging ratio detecting method of detecting an enlarging ratio of a digital image data in which the enlarging ratio of an image is unknown. The image data enlarging ratio detecting method includes steps of:

(a) sectioning the digital image data, in which the enlarging ratio of an image is unknown, by predetermined horizontal or perpendicular block sizes;

(b) frequency-converting sectioned blocks into a two-dimension;

(c) adding up frequencies present in the above-described blocks to obtain sums for each frequency across all of the blocks;

(d) obtaining a set of frequencies at which energy is collecting using a result of the above-described sum; and (e) calculating an enlarging ratio of an image based on the above-described set of frequencies at which energy is collecting.

Furthermore, the above-described objective of the present invention is achieved by an image data reducing ratio detecting method of detecting a reducing ratio of a digital image data in which the reducing ratio of an image is unknown. The image data reducing ratio detecting method includes steps of:

(a) sectioning the digital image data, in which the reducing ratio of an image is unknown, by predetermined horizontal or perpendicular block sizes;

(b) frequency-converting sectioned blocks into a two-dimension;

(c) adding up frequencies present in the above-described blocks to obtain sums for each frequency across all of the blocks; frequency;

(d) obtaining a set of frequencies at which energy is collecting using a result of the above-described sum; and (e) calculating a reducing ratio of an image based on the above-described set of frequencies at which energy is collecting.

In the above-described step (d), n frequencies in order of the highest energy are selected, and a frequency-energy distribution in which energy is collecting is obtained, and in the above-described step (e), a set of frequencies at which energy is collecting is determined based on the obtained frequency-energy distribution, and an enlarging ratio or reducing ratio that corresponds to this set is calculated.

In addition, even though a correct enlarging ratio or reducing ratio cannot be obtained one time, it is possible to obtain a more correct enlarging ratio or reducing ratio by repeating the above-described steps again.

In accordance with the present invention as constructed above, an enlarging ratio or reducing ratio of an image is not affected by a disturbance. The reason thereof is that it is not necessary to attach the reducing or enlarging ratio to the image as a data in a form of adding the ratio to the image, and that the data of the enlarging ratio or reducing ratio is not lost.

Also, in accordance with the present invention, it is possible to prevent deterioration of an image. The reason thereof is that it is not necessary to insert an image reference signal for finding original size of an image into the image.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Embodiments of the present invention will be explained by referring to drawings.

Figure 1:
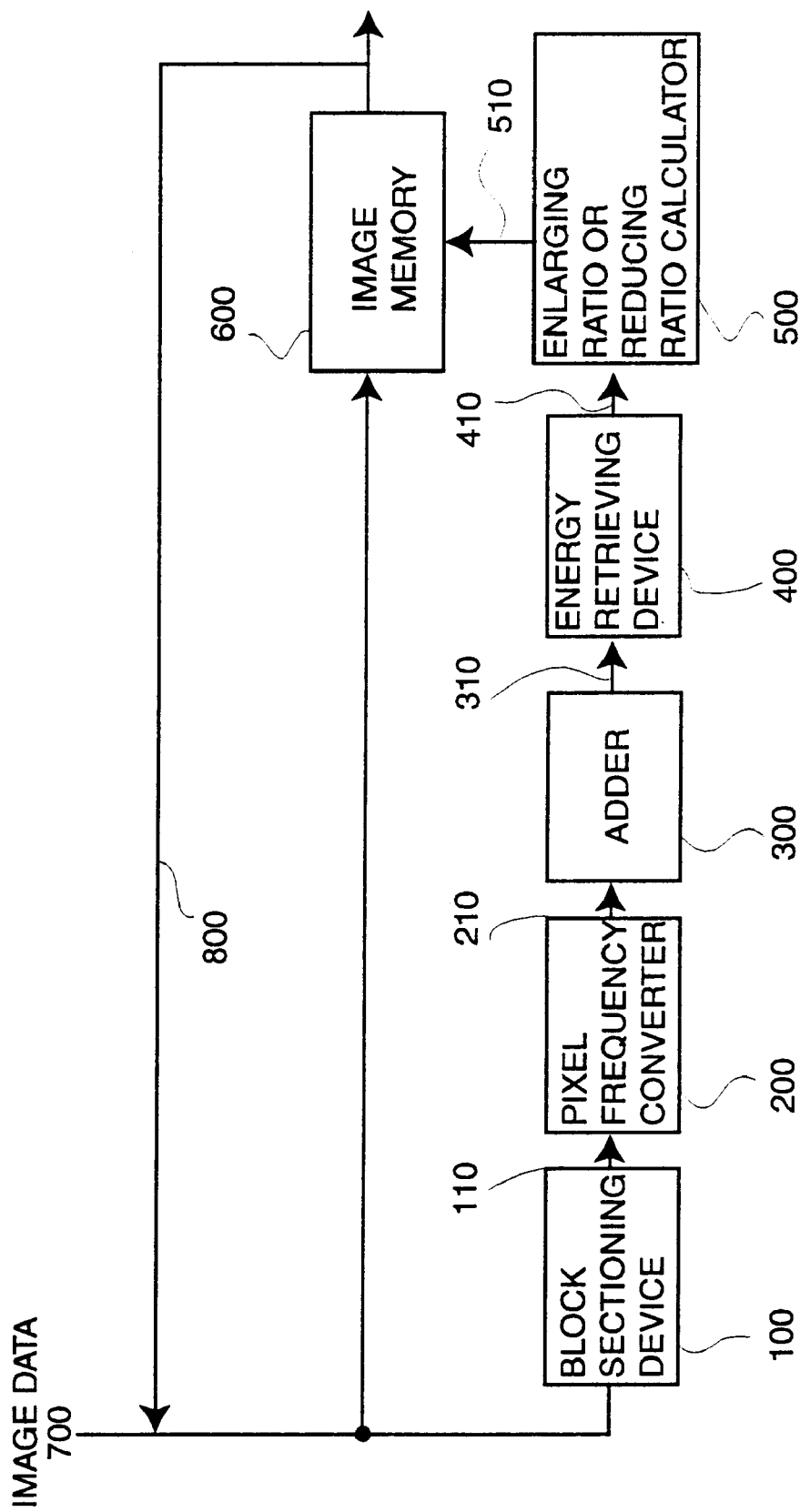
FIG. 1 is a block diagram showing construction of an embodiment of an image reducing or enlarging ratio detecting circuit of the present invention.

FIG. 1 is a block diagram of an enlarging ratio or reducing ratio detecting apparatus in this embodiment.

In FIG. 1, a reference numeral 100 is a block sectioning device. This block sectioning device 100 sections an image data, in which an enlarging ratio or reducing ratio of an image is unknown, by predetermined horizontal or perpendicular block size (horizontal n pixels×perpendicular n lines). In this embodiment, an image data 700 is to be sectioned by horizontal eight pixels and perpendicular eight lines as one block. In addition, the case in which the block size is not 8×8 is handled in the same manner, and basically, it can be realized by having a memory corresponding to the number of perpendicular lines to be sectioned.

A reference numeral 200 is a pixel frequency converter. This pixel frequency converter 200 converts a sectioned block with respect to pixel frequency into a two-dimension. In this embodiment, a pixel data 110 formed of blocks is discrete cosine transform (DCT)-converted, and one set of frequencies is obtained for one block. In addition, with regard to a method of the frequency conversion, general frequency conversion, such as FFT, can be adopted.

A reference numeral 300 is an adder. This adder 300 calculates sums for the same frequency components present in the various blocks over an entire image plane. For example, for a frequency $f_1$, the adder 300 calculates a sum of the frequency $f_1$ over the entire image plane by adding the frequency $f_1$ of each block. The calculation for all frequencies, such as a frequency $f_2$, a frequency $f_3$, . . . , is conducted in the same manner.

A reference numeral 400 is an energy retrieving device. This energy retrieving device 400 retrieves frequency components in which energy is collecting, using an added result. In this embodiment, n signals of frequency summing signals 310, which have frequencies in order of the highest energy, are selected. In other words, a set of frequencies at which energy is collecting is obtained.

A reference numeral 500 is an enlarging ratio or reducing ratio calculator. This enlarging ratio or reducing ratio calculator 500 calculates an enlarging ratio or a reducing ratio based on a retrieved result. Particularly, the enlarging ratio or reducing ratio calculator 500 previously stores sets of frequencies at which high energy corresponding to several kinds of enlarging ratios or reducing ratios is collecting, determines from energy retrieving signals 410 a set of frequencies at which energy is collecting, and calculates the enlarging ratio or reducing ratio by making the determined set correspond to the previously stored sets.

A reference numeral 600 is an image memory, and stores the image data 700 and restores an image to an image having the obtained enlarging ratio or reducing ratio.

Moreover, the apparatus has a loop circuit 800 for returning an image, which is restored to an image having an obtained rough enlarging ratio or reducing ratio, to the block sectioning device again, in case that a correct enlarging ratio or reducing ratio cannot be obtained at one processing.

In accordance with this apparatus constructed above, it is possible to detect the enlarging ratio or reducing ratio without depending on an additional data indicating an enlarging ratio or reducing ratio.

Next, operation of this apparatus will be explained.

The block size sectioning device 100 sections the image data 700 by blocks of predetermined horizontal or perpendicular sizes. Here, for simplicity of the explanation, the explanation will be made under an assumption of horizontal eight pixels and perpendicular eight lines. In case of 8×8 sizes, the block size sectioning circuit generally has a memory corresponding to eight lines, re-conducts addressing every line and every pixel, and sequentially stores pixel data in a memory. When data corresponding to 8×8 pixels is stored in the memory, the data is transferred to the pixel frequency converter 200.

The pixel frequency converter 200 receives the image data 110 formed of blocks and frequency-converts data pixels of 8×8 sizes. For simplicity of the explanation, DCT conversion is used here. The data to which the frequency conversion is applied shows a frequency energy distribution that represents characteristic of the sectioned block. This distribution is output as two-dimensional frequency signals 210.

The adder 300 obtains sums of energies for the each frequency present over an entire image plane from the two-dimensional frequency signals 210. While the frequency energy distribution of each sectioned block shows individual characteristics thereof, the distribution obtained by the sum over the entire image plane describes an energy distribution over the entire image plane. This is input to the energy retrieving device 400 as frequency summing signals 310.

The energy retrieving device 400 can determine unbalance of the entire image plane by selecting n signals of the frequency summing signals 310, which have frequencies in order of the highest energy. For example, in case that the image plane is enlarged two times, in the frequency summing signals 310, energy of the highest frequency is extremely low, and energy of a frequency that is a next high frequency is high. Accordingly, a group of frequencies that have high energy is retrieved by the energy retrieving device 400, and a result of the retrieval is output as energy retrieving signals 410.

The enlarging ratio or reducing ratio calculator 500 finds a set of frequencies from an energy distribution of a frequency having high energy, which is shown by the energy retrieving signals 410. And, the calculator 500 calculates an enlarging ratio or a reducing ratio from the sets of frequencies of an energy distribution corresponding to the previously stored enlarging ratio or reducing ratio and the set of frequencies of an energy distribution determined from the energy retrieving signals 410.

Figure 2:
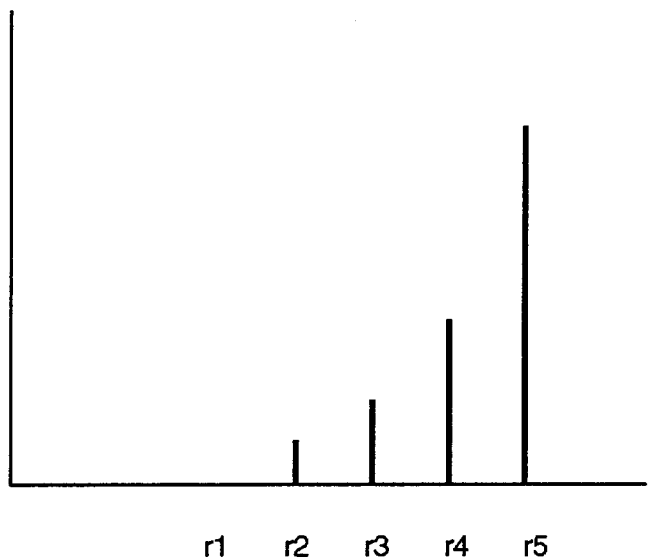
FIG. 2 is an energy distribution of an original image.
Figure 3:
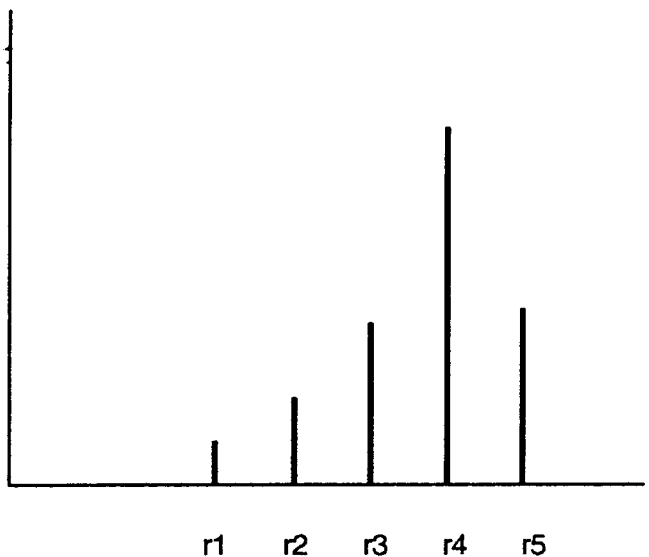
FIG. 3 is an energy distribution in case of being enlarged twofold.
Figure 4:
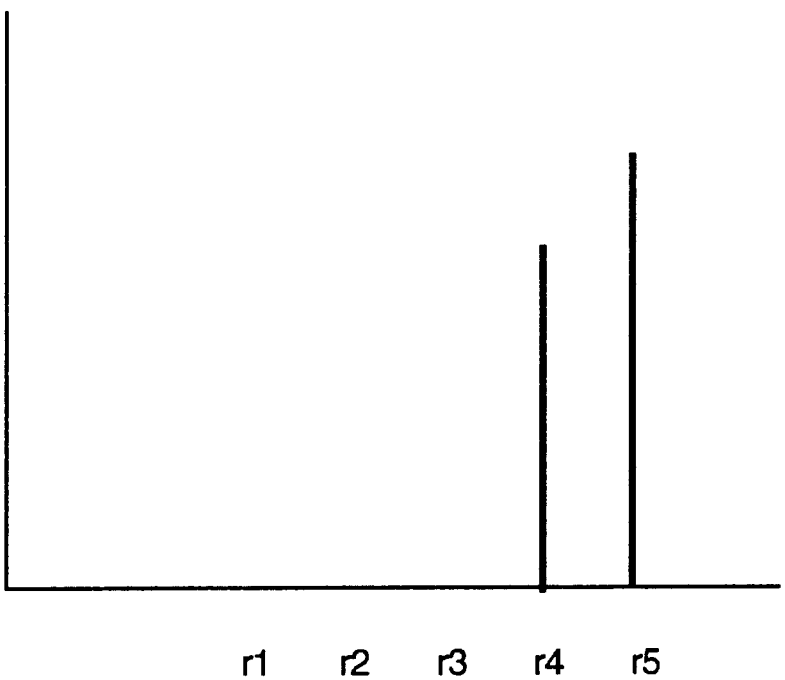
FIG. 4 is an energy distribution in case that a reducing ratio is 1/2.

For example, in case of the DCT conversion, in a distribution of an original image, energy usually collects at highest frequencies as shown in FIG. 2. On the other hand, in case that an image enlarging ratio is twofold, as shown in FIG. 3, an energy distribution (a set of frequencies having high energy) causes offset by one frequency. Also, in case of a reducing ratio of 1/2, as shown in FIG. 4, energy collects at high frequencies. Such information is previously stored in the enlarging ratio or reducing ratio calculator 500, and the enlarging ratio or reducing ratio is calculated from the set of frequencies having high energy that was output from the energy retrieving signals 410.

For example, if an energy distribution (a set of frequencies having high energy) that was output from the energy retrieving signals 410 is a distribution shown in FIG. 3, the enlarging ratio or reducing ratio calculator 500 can determined that an enlarging ratio of an image data is two, and if an energy distribution (a set of frequencies having high energy) that was output from the energy retrieving signals 410 is a distribution shown in FIG. 4, the enlarging ratio or reducing ratio calculator 500 can determined that a reducing ratio of an image data is 1/2.

The reducing or enlarging ratio of an image is calculated in this manner and the enlarging ratio is output to the image memory 600, and it is possible to restore the image to an image having an original image ratio.

In addition, in case that a correct enlarging ratio or reducing ratio cannot be obtained at one processing, an image, which is restored to an image having an obtained rough enlarging ratio or reducing ratio, is returned to the block sectioning device 100 again by the loop circuit 800, and the same operation mentioned above is repeated.

The entire disclosure of Japanese Patent Application No. 9-329785 filed on Dec. 1, 1997 including specification, claims, drawing and summary are incorporated herein by reference in its entirety.

What is claimed is:

1. An enlarging ratio detecting apparatus for detecting an enlarging ratio of digital image data in which said enlarging ratio of an image is unknown, comprising:

section means for sectioning said digital image data into horizontal or perpendicular block sizes;

conversion means for frequency-converting said sectioned blocks;

addition means for adding respective frequencies of said sectioned blocks;

retrieval means for retrieving frequencies at which energy is collected based on operation of said addition means;

calculation means for calculating an enlarging ratio from said retrieved frequencies; and restoration means for restoring an image from said image data with said enlarging ratio.

2. An enlarging ratio detecting apparatus according to claim 1, wherein said conversion means includes means for applying DCT conversion to said sectioned blocks.

3. An enlarging ratio detecting apparatus according to claim 1, wherein said retrieval means can select a group of signals out of said summed frequencies which have a high energy to obtain an energy distribution.

4. An enlarging ratio detecting apparatus according to claim 1, wherein said calculation means can determine a set of frequencies from an energy distribution obtained by said retrieval means, at which energy collects, and can calculate said enlarging ratio of said image.

5. An enlarging ratio detecting apparatus according to claim 1, further including a loop circuit effective to return an output from said restoration means to said section means.

6. A reducing ratio detecting apparatus for detecting a reducing ratio of digital image data in which said reducing ratio of an image is unknown, comprising:

section means for sectioning said digital image data into horizontal or perpendicular block sizes;

conversion means for frequency-converting sectioned blocks;

addition means for adding respective frequencies of said sectioned blocks;

retrieval means for retrieving frequencies at which energy is collected based on operation of said addition means;

calculation means for calculating said reducing ratio from said retrieved frequencies; and restoration means for restoring an image from said image data with said reducing ratio.

7. A reducing ratio detecting apparatus according to claim 6, wherein said conversion means includes means for applying DCT conversion to said sectioned blocks.

8. A reducing ratio detecting apparatus according to claim 6, wherein said retrieval means can select a group of signals out of said summed frequencies which have a high energy to obtain an energy distribution.

9. A reducing ratio detecting apparatus according to claim 6, wherein said calculation means can determine a set of frequencies from an energy distribution obtained by said retrieval means, at which energy collects, and can calculate said reducing ratio of said image.

10. A reducing ratio detecting apparatus according to claim 6, further including a loop circuit effective to return an output from said restoration means to said section means.

11. An enlarging ratio detecting apparatus for detecting an enlarging ratio of digital image data in which said enlarging ratio of an image is unknown, comprising:

section means for sectioning said digital image data into horizontal or perpendicular block sizes;

conversion means for frequency-converting said sectioned blocks using a DCT conversion;

addition means for obtaining a sum of individual frequencies of said sectioned blocks;

retrieval means for retrieving a group of said summed frequencies which have an energy above a threshold, and outputting an energy distribution of frequencies;

calculation means for determining a set of frequencies based on said energy distribution, and calculating an enlarging ratio of said image corresponding to said set; and restoration means for restoring an image from said image data with said enlarging ratio.

12. An enlarging ratio detecting apparatus according to claim 11, further including a loop circuit effective to return an output from said restoration means to said section means.

13. A reducing ratio detecting apparatus for detecting a reducing ratio of digital image data in which said reducing ratio of an image is unknown, comprising:

section means for sectioning said digital image data into horizontal or perpendicular block sizes;

conversion means for frequency-converting said sectioned blocks using a DCT conversion;

addition means for obtaining a sum of individual frequencies of said sectioned blocks;

retrieval means for selecting a group of said summed frequencies which have an energy above a threshold, and outputting an energy distribution of frequencies;

calculation means for determining a set of frequencies based on said energy distribution and calculating said reducing ratio of said image corresponding to said set; and restoration means for restoring an image from said image data with said reducing ratio.

14. A reducing ratio detecting apparatus according to claim 13, further including a loop circuit effective to return an output from said restoration means to said section means.

15. An image data enlarging ratio detecting method for detecting an enlarging ratio of digital image data in which said enlarging ratio of an image is unknown, said method comprising:

(a) sectioning said digital image data into horizontal or perpendicular block sizes;

(b) frequency-converting said sectioned blocks;

(c) adding individual frequencies of said sectioned blocks to obtain sums for each frequency;

(d) obtaining a set of frequencies at which energy collects in said sums for each frequency; and (e) calculating said enlarging ratio of said image based on said set of frequencies at which energy collects.

16. An image data enlarging ratio detecting method according to claim 15, further comprising (f) restoring said image data with said calculated enlarging ratio.

17. An image data enlarging ratio detecting method according to claim 16, wherein said method applies (a) to (f) to said image data at least a second time to restore said image according to said enlarging ratio.

18. An image data enlarging ratio detecting method according to claim 15, wherein, in said step (b), frequency-conversion is DCT conversion. DCT conversion.

19. An image data reducing ratio detecting method for detecting a reducing ratio of digital image data in which said reducing ratio of an image is unknown, said method comprising:

(a) sectioning said digital image data into horizontal or perpendicular block sizes;

(b) frequency-converting said sectioned blocks;

(c) adding individual frequencies of said sectioned blocks to obtain sums for each frequency;

(d) obtaining a set of frequencies at which energy collects in said sums for each frequency; and (e) calculating said reducing ratio of said image based on said set of frequencies at which energy collects.

20. An image data reducing ratio detecting method according to claim 19, further comprising (f) restoring said image data with said calculated reducing ratio.

21. An image data reducing ratio detecting method according to claim 20, wherein said method applies (a) to (f) to said image data at least a second time to restore said image according to said calculated reducing ratio.

22. An image data reducing ratio detecting method according to claim 19, wherein, said frequency-converting is accomplished using a DCT conversion.

23. An image ratio calculating device, comprising:

a sectioning device operative to divide image data into a plurality of blocks, each of said blocks representing a portion of an image defined by said image data;

a frequency converter operative to convert each of said blocks into a frequency representation;

a frequency adder operative to sum like frequencies extracted from each of said blocks; and a ratio calculator operative to calculate an image ratio from said sums of like frequencies.

24. An image ratio calculating device according to claim 23, wherein:

said frequency converter obtains said frequency representation with a DCT conversion;

said ratio calculator uses sums of frequencies that contain a high energy to calculate said image ratio; and an image restorer operates to produce said image according to an original aspect using said image ratio.

25. A method of calculating an image ratio, comprising:

dividing image data into a plurality of blocks, each of said blocks representing a portion of an image defined by said image data;

converting each of said blocks into a frequency representation;

summing like frequencies extracted from each of said blocks; and calculating an image ratio from said sums of like frequencies.

26. A method of calculating an image ratio according to claim 25, wherein:

said blocks are converted to a frequency representation using a DCT conversion;

said image ratio calculation uses sums of frequencies that contain a high energy; and further including restoring said image according to an original aspect using said image ratio.

* * * * *